United States Patent
Kaku (10) Patent No.: US 7,684,679 B2
(45) Date of Patent: Mar. 23, 2010

(54) IMAGE RECORDING APPARATUS

(75) Inventor: Junya Kaku, Hyogo (JP)

(73) Assignee: Sanyo Electric Co., Ltd., Moriguchi-shi (JP)

(*) Notice: Subject to any disclaimer, the term of this patent is extended or adjusted under 35 U.S.C. 154(b) by 1745 days.

(21) Appl. No.: 10/318,197

(22) Filed: Dec. 13, 2002

(65) Prior Publication Data

US 2003/0113099 A1 Jun. 19, 2003

(30) Foreign Application Priority Data

Dec. 18, 2001 (JP) ............................ 2001-383997

(51) Int. Cl.
*H04N 5/00* (2006.01)

(52) U.S. Cl. .................... 386/117; 386/120; 386/121

(58) Field of Classification Search ............... 386/69, 386/125, 52, 57, 82, 117, 68, 46, 1, E5.072, 386/70, 96, 101–107, 120–129, 252; 345/169, 345/157, 473, 6, 7, 52, 68, 69, 117, 121, 345/125, 467, 560, 555, 57; 382/128, 232, 382/104, 165, 156, 199, 194; 347/116; 348/96, 348/584; 360/2; 725/112
See application file for complete search history.

(56) References Cited

U.S. PATENT DOCUMENTS

| 3,803,350 | A | * | 4/1974 | Lemelson | 348/96 |
|---|---|---|---|---|---|
| 3,818,500 | A | * | 6/1974 | Lemelson | 360/2 |
| 3,943,563 | A | * | 3/1976 | Lemelson | 360/2 |
| 4,213,163 | A | * | 7/1980 | Lemelson | 386/121 |
| 4,402,018 | A | * | 8/1983 | Wada et al. | 386/129 |
| 4,769,721 | A | * | 9/1988 | Kajiura | 386/69 |
| 4,931,815 | A | * | 6/1990 | Sato et al. | 347/116 |
| 5,038,217 | A | * | 8/1991 | Hayashi et al. | 386/70 |
| 5,095,391 | A | * | 3/1992 | Sakaegi | 386/117 |
| 5,097,363 | A | * | 3/1992 | Takei et al. | 386/69 |
| 5,099,260 | A | * | 3/1992 | Sato et al. | 347/116 |
| 5,177,645 | A | * | 1/1993 | Lemelson | 386/117 |
| 5,202,798 | A | * | 4/1993 | Takei et al. | 386/120 |
| 5,491,591 | A | * | 2/1996 | Lemelson | 386/82 |
| 5,497,246 | A | * | 3/1996 | Abe | 382/252 |
| 5,589,943 | A | * | 12/1996 | Kozuki et al. | 386/121 |
| RE36,589 | E | * | 2/2000 | Akamine et al. | 369/14 |
| 6,069,994 | A | * | 5/2000 | Kozuki et al. | 386/121 |

(Continued)

FOREIGN PATENT DOCUMENTS

JP 11-266420 9/1999

(Continued)

*Primary Examiner*—Prabodh M Dharia
(74) *Attorney, Agent, or Firm*—Westerman, Hattori, Daniels & Adrian, LLP (57) ABSTRACT

An image recording apparatus includes a JPEG CODEC that produces JPEG data by compressing image data. Markers SOI and EOI are embedded in produced JPEG data, and such the JPEG data is recorded into a magnetooptical disk by a disk drive. Upon completion of recording a plurality of frames of the JPEG data, each frame of the JPEG data is read out into a work area of an SDRAM, and the markers SOI and EOI are detected from the read JPEG data. Index information of each frame of the JPEG data is generated on the basis of the detected markers SOI and EOI. Generated index information is recorded following a last frame of the JPEG data.

12 Claims, 10 Drawing Sheets

U.S. PATENT DOCUMENTS

| | | | |
|---|---|---|---|
| 6,175,380 B1* | 1/2001 | Van Den Bosch | 348/84 |
| 6,301,203 B1* | 10/2001 | Maeda et al. | 369/30.1 |
| 6,400,667 B1* | 6/2002 | Utsumi et al. | 369/53.34 |
| 6,496,896 B1* | 12/2002 | Inoue | 710/306 |
| 6,501,856 B2* | 12/2002 | Kuwano et al. | 382/194 |
| 6,658,527 B1* | 12/2003 | Hiroyasu | 711/112 |
| 6,686,970 B1* | 2/2004 | Windle | 348/584 |
| 6,751,399 B1* | 6/2004 | Okabayashi et al. | 386/68 |
| 7,027,054 B1* | 4/2006 | Cheiky et al. | 345/473 |
| 7,248,775 B2* | 7/2007 | Tsunoda | 386/46 |
| RE39,830 E* | 9/2007 | Balabanovic | 345/419 |
| 7,353,994 B2* | 4/2008 | Farrall et al. | 235/454 |
| 2001/0056544 A1* | 12/2001 | Walker | 713/200 |
| 2002/0037269 A1* | 3/2002 | Liotta et al. | 424/78.08 |
| 2002/0069218 A1* | 6/2002 | Sull et al. | 707/501.1 |
| 2002/0102093 A1* | 8/2002 | Hisatomi et al. | 386/69 |
| 2002/0168657 A1* | 11/2002 | Chen et al. | 435/6 |
| 2003/0177503 A1* | 9/2003 | Sull et al. | 725/112 |
| 2004/0234240 A1* | 11/2004 | Kurosawa et al. | 386/82 |
| 2006/0045466 A1* | 3/2006 | Sasaki et al. | 386/52 |

FOREIGN PATENT DOCUMENTS

JP  2000-4421  1/2000

* cited by examiner

| i | FRAME | |
|---|---|---|
| | LOCATION INFORMATION | SIZE INFORMATION |
| 0 | | |
| 1 | | |
| 2 | | |
| 3 | | |
| 4 | | |
| 5 | | |
| ⋮ | ⋮ | ⋮ |

IMAGE RECORDING APPARATUS

BACKGROUND OF THE INVENTION

1. Field of the Invention

The present invention relates to an image recording apparatus. More specifically, the present invention relates to an image recording apparatus that is applied to a digital camera, and records a plurality of still image signals into a recording medium in a state that markers are added to the respective signals.

2. Description of the Prior Art

One example of such a kind of a conventional digital camera is disclosed in Japanese Patent Laying-open No. 2001-298693 laid-open on Oct. 26, 2001. In this prior art, a plurality of still images photographed at arbitrary time intervals are stored into a temporary area of a recording medium, and the plurality of still images are recorded into a normal recording area of the recording medium as a moving image file after completing the desired number of photographings. This makes it possible to reproduce a plurality of still images photographed in a specific manner as the moving image. In the prior art, however, in order to reproduce the plurality of the photographed still images as the moving image, it requires the above-described complicated process, thus troublesome.

SUMMARY OF THE INVENTION

Therefore, it is a primary object of the present invention to provide an image recording apparatus capable of reproducing a plurality of still images as a moving image by a simple process toward a plurality of still image signals.

According to the present invention, an image recording apparatus for recording a plurality of still image signals into a recording medium in a state that markers are added to the respective signals, comprises; a detector for detecting the markers recorded in the recording medium; a generator for generating recording location information of the plurality of still image signals on the basis of the markers detected by the detector; and a recorder for recording into the recording medium the recording location information generated by the generator in association with the plurality of still image signals.

The plurality of still image signals are recorded into the recording medium in a state that the markers are added to the respective signals. The recorded markers are detected by the detector, and the generator generates the recording location information of the plurality of still image signals on the basis of the detected markers. The generated recording location information is recorded into the recording medium in a state of being associated with the plurality of still image signals.

The recording location information generated on the basis of the markers are associated with the plurality of still image signals, thus possible to continuously reproduce the plurality of still image signals by referring to the recording location information. That is, it is possible to reproduce the plurality of still image signals as a moving image by a simple process, which is to generate the recording location information. In addition, it is not needed to generate a temporary area as in the prior art, thus possible to improve efficiency of a capacity of the recording medium.

The markers are preferably added to a head and a last of the respective still image signals. Herein, the recording location information includes a head address and a size of the respective still image signals.

Preferably, the detector reads out the image signal recorded in the recording medium into an internal memory so as to detect the markers by examining the internal memory.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
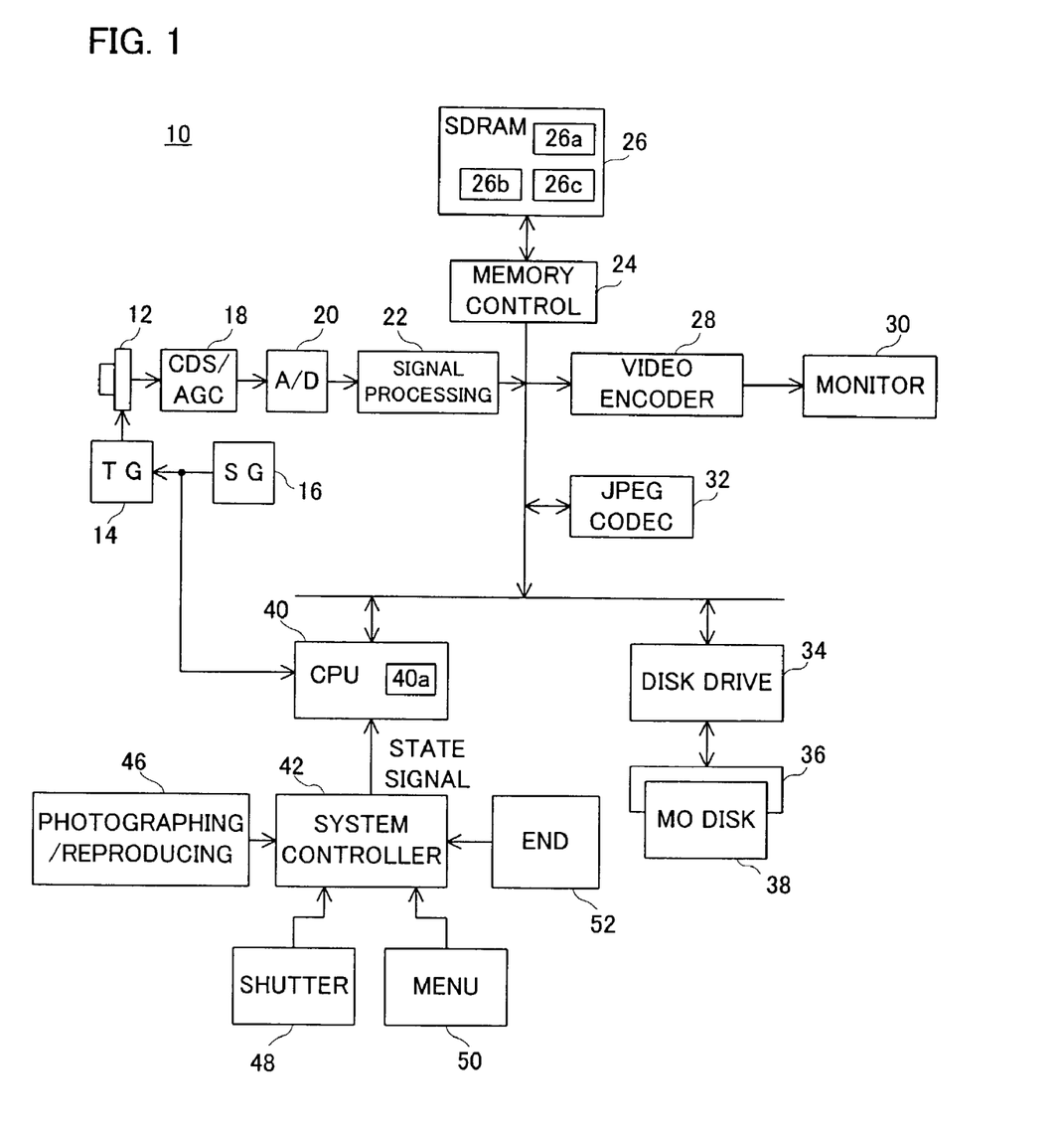
FIG. 1 is a block diagram showing one embodiment of the present invention.

Referring to FIG. 1, a digital camera 10 in this embodiment includes an image sensor 12. An optical image of an object is incident on a light-receiving surface of the image sensor 12, and a camera signal (raw image signal) that corresponds to the incident optical image is produced by a photoelectronic conversion. A timing generator (TG) 14 reads out the camera signal from the image sensor 12 in response to a vertical synchronization signal and a horizontal synchronization signal outputted from a signal generator (SG) 16 when a process instruction is applied from a CPU 40. From the image sensor 12, the camera signal having a resolution previously set is outputted at a frame rate previously set. The outputted camera signal is converted into a digital signal by an A/D converter 20 via a well-known noise removal and a level adjustment in a CDS/AGC circuit 18.

When a process instruction is applied from the CPU 40, a signal processing circuit 22 subjects camera data outputted from the A/D converter 20 to well-known signal processings such as color separation, an RGB conversion, a white balance adjustment, a YUV conversion, and so on so as to produce image data formed of a luminance component (Y data) and chrominance components (U data, V data). Produced image data is applied to a memory control circuit 24, and written into an image data storing area 26a of the SDRAM 26 by the memory control circuit 24. It is noted that each address of the SDRAM 26 is 8 bits.

When a process instruction is applied from the CPU 40, a video encoder 28 reads out the image data stored in the image data storing area 26a through the memory control circuit 24, and encodes the read image data. The encoded image signal is supplied to a monitor 30, and an image that corresponds to the image signal is displayed on a screen.

Upon receipt of a compression instruction from the CPU 40, a JPEG CODEC 32 causes the memory control circuit 24 to read out one frame of image data stored in the image data storing area 26a, and subjects the read image data to a compression process according to a JPEG format. JPEG data produced by the compression process is applied to the memory control circuit 24 from the JPEG CODEC 32, and stored into a JPEG data storing area 26b by the memory control circuit 24. On the other hand, upon receipt of an expansion instruction from the CPU 40, the JPEG CODEC 32 causes the memory control circuit 24 to read out one frame of the JPEG data stored in the JPEG data storing area 26b, and subject the read JPEG data to an expansion process according to the JPEG format. Upon obtaining the expanded image data, the JPEG CODEC 32 stores the expanded image data into the image data storing area 26a through the memory control circuit 24.

In addition to issuing the aforementioned process instructions, the CPU 40 carries out recording/reproducing processes of the JPEG data by itself. At the time of recording, the CPU 40 reads out the JPEG data stored in the JPEG data storing area 26b through the memory control circuit 24, and applies the read JPEG data to a disk drive 34 together with a recording instruction. The JPEG data is recorded into a magnetooptical disk 38 according to an FAT (File Allocation Table) system by the disk drive 34. At the time of reproducing, the CPU 40 applies a reproducing instruction to the disk drive 34, and writes the JPEG data read out from the magnetooptical disk 38 by the disk drive 34 into the JPEG data storing area 26b through the memory control circuit 24.

Figure 2:
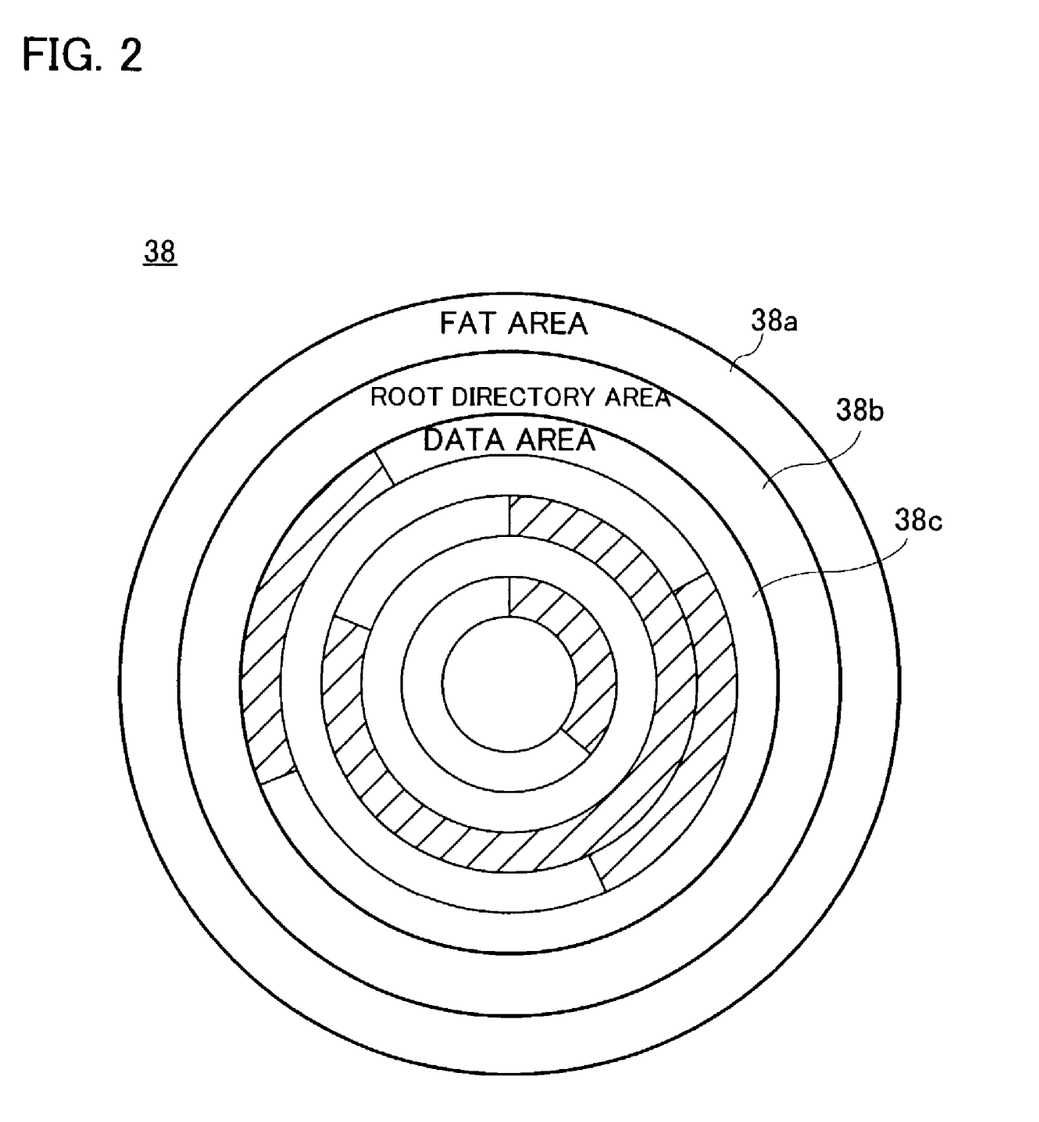
FIG. 2 is an illustrative view showing one example of structure of a magnetooptical disk.

The magnetooptical disk 38 is a non-volatile detachable recording medium, and an FAT area 38a, a root directory area 38b, and a data area 38c are formed on a recording surface as shown in FIG. 2. Such the magnetooptical disk 38 becomes accessible by the disk drive 34 when attached to a slot 36.

Various kinds of operation keys 46-54 are connected to a system controller 42, and if a key operation is performed by an operator, a state signal showing a key state as of that time is applied to the CPU 40 from the system controller 42. Herein, a photographing/reproducing change key 46 is a key for selecting one of a photographing mode and a reproducing mode. A shutter 48 is a key that becomes effective in the photographing mode and is for issuing a photographing trigger.

A menu key 50 is a key for performing a photographing setting. More specifically, by operating the menu key 50, it is possible to select any one of an interval photographing/animation photographing/normal photographing as a photographing manner and any one of VGA/QVGA as a resolution, and any one of 15 fps/30 fps as a frame rate. In addition, when the interval photographing is selected, it is possible to set an interval time period and the number of frames to be photographed. An end key 52 is a key for ending the animation photographing.

Referring to FIG. 3-FIG. 7, an operation of the CPU 40 at a time of photographing is described. A photographing setting process is carried out in a step S1. That is, a desired photographing setting is performed according to an operation of the menu key 50 by the operator. In a succeeding step S3, a selected photographing manner is determined. When the normal photographing is selected, the process proceeds to a corresponding process, and when the interval photographing or the animation photographing is selected, the process proceeds to processes that follow a step S5.

Figure 3:
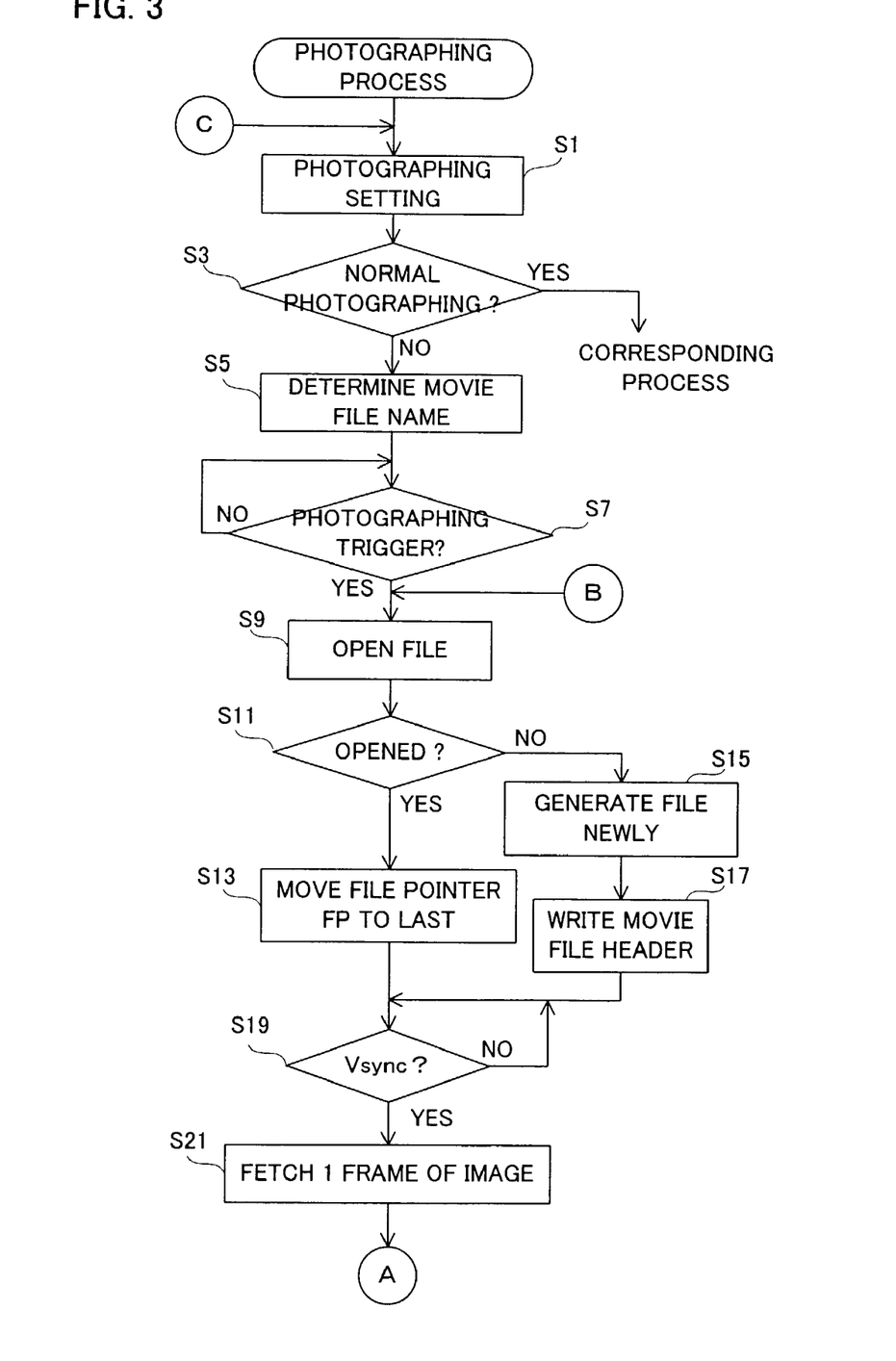
FIG. 3 is a flowchart showing one portion of an operation of the FIG. 1 embodiment.
Figure 4:
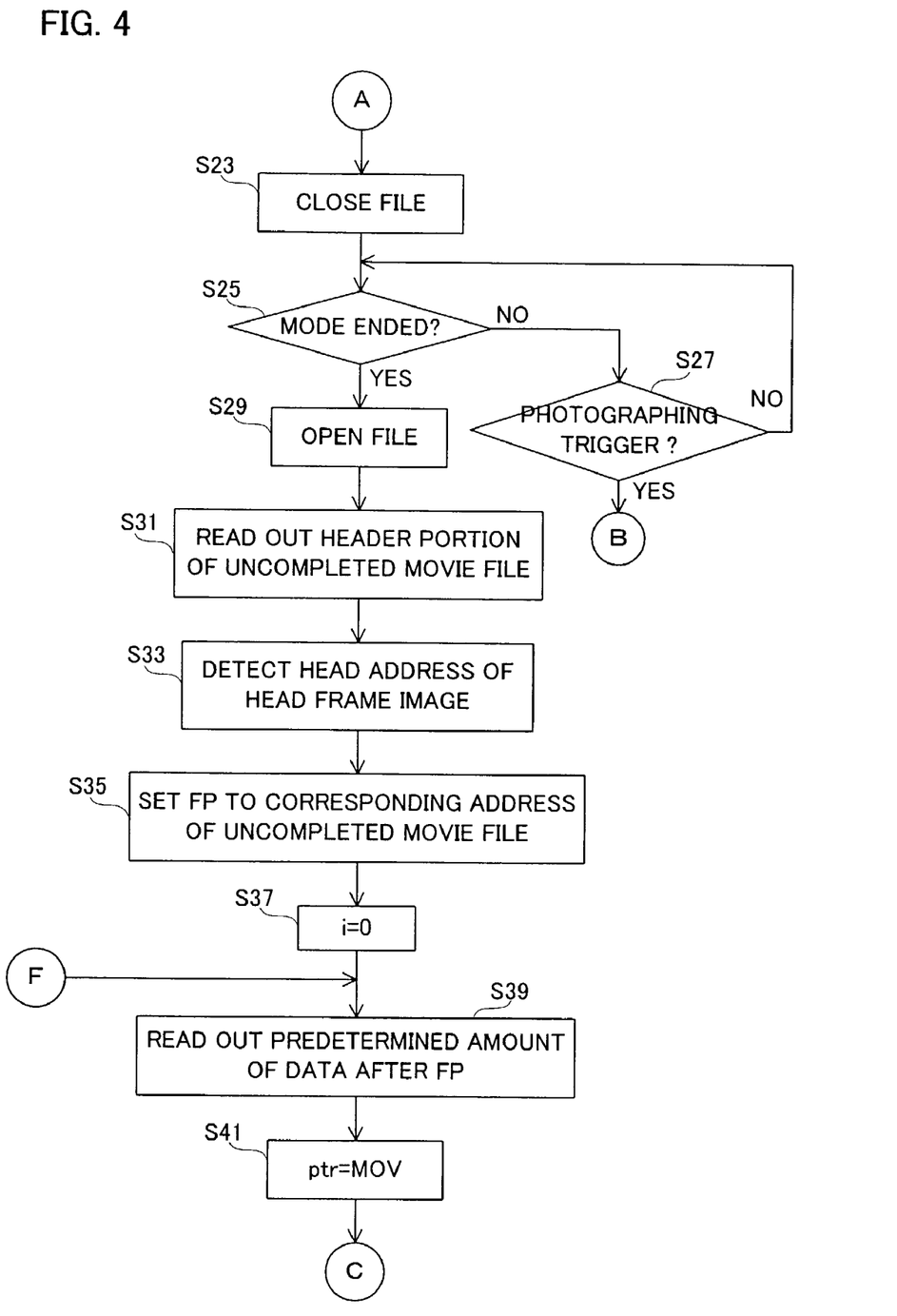
FIG. 4 is a flowchart showing another portion of the operation of the FIG. 1 embodiment.
Figure 5:
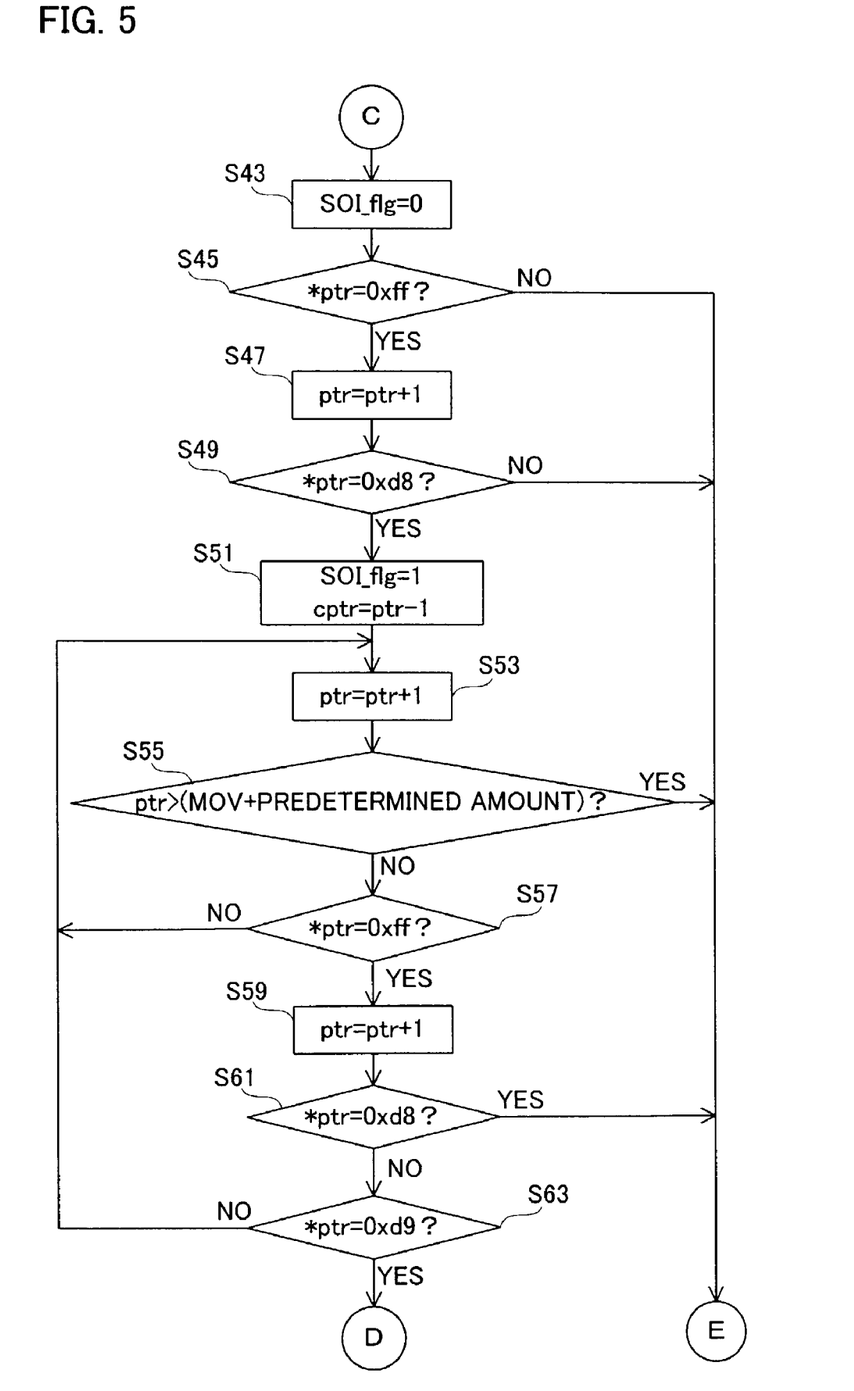
FIG. 5 is a flowchart showing the other portion of the operation of the FIG. 1 embodiment.
Figure 6:
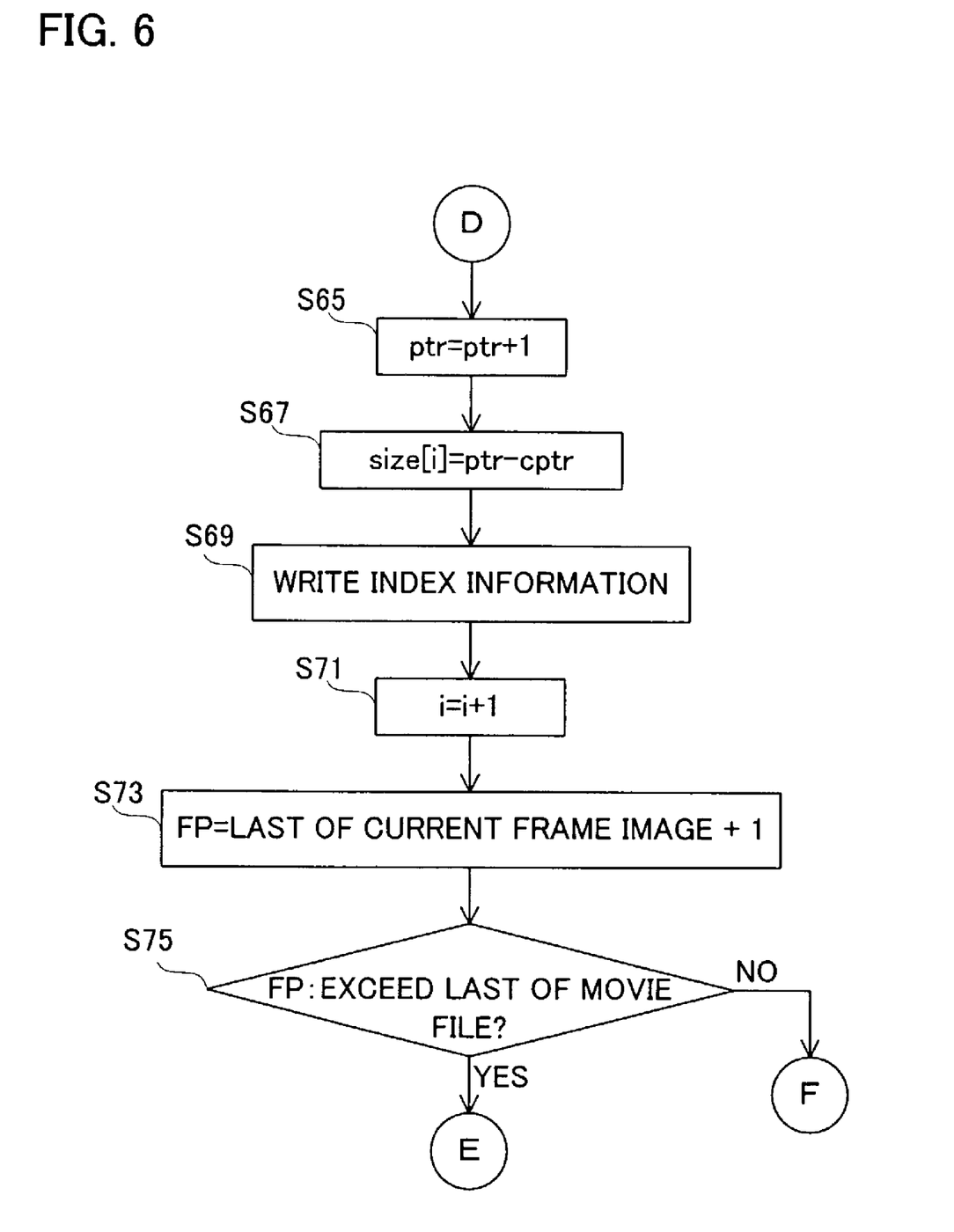
FIG. 6 is a flowchart showing further portion of the operation of the FIG. 1 embodiment.
Figure 7:
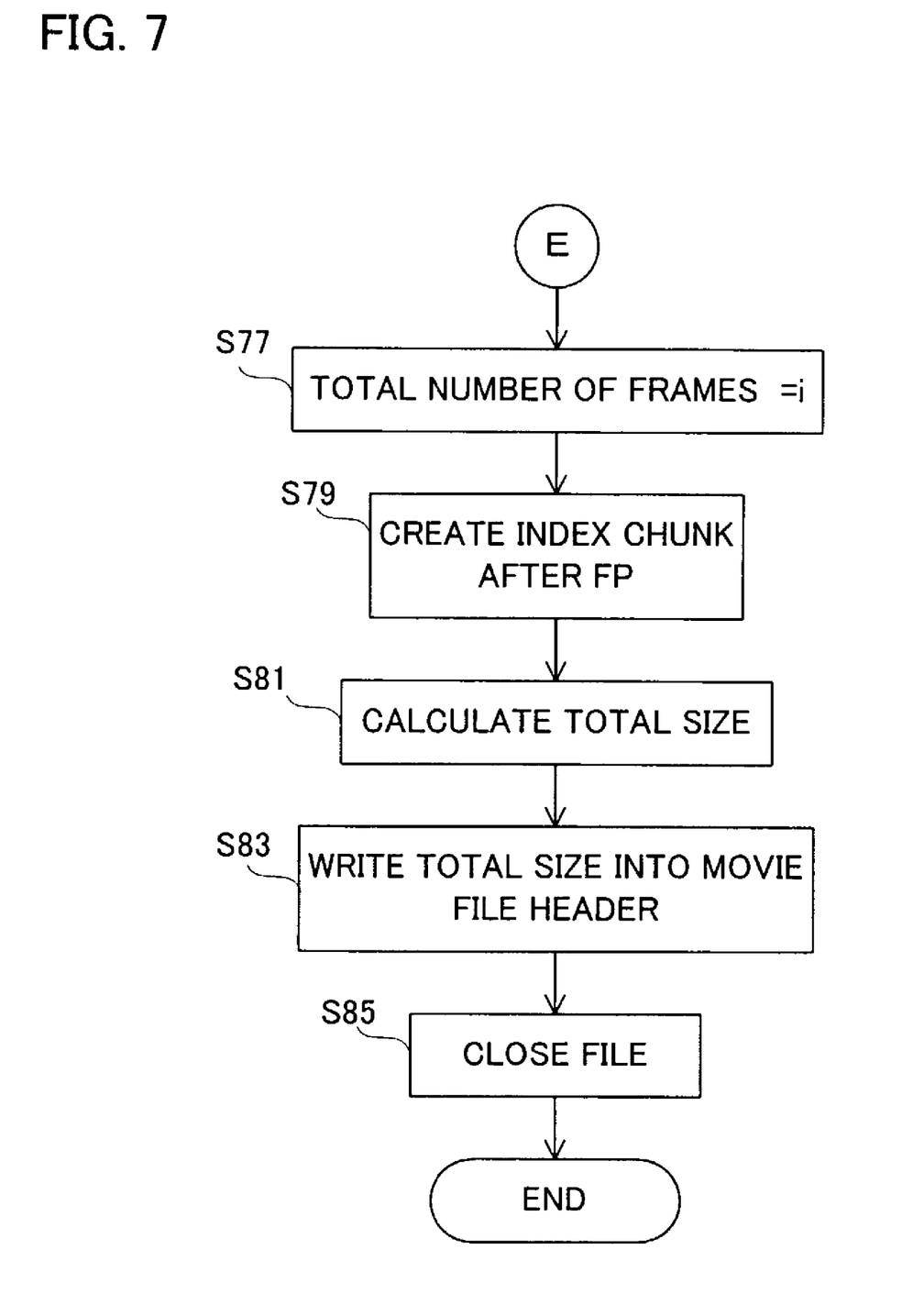
FIG. 7 is a flowchart showing another portion of the operation of the FIG. 1 embodiment.

Firstly, a movie file name is determined in the step S5, and next, it is determined whether or not the photographing trigger is issued in a step S7. In the interval photographing, the photographing trigger is issued at every time that the set interval period elapses, and in the animation photographing, the photographing trigger is issued by an operation of the shutter key 48. If the photographing trigger is issued, the process proceeds to a step S9 so as to attempt to open the movie file having the file name determined in the step S5. More specifically, a file open is requested to the disk drive 34 using a file pass including the file name.

In a step S11, it is determined whether or not the desired movie file is opened on the basis of a signal sent back from the disk drive 34 in response to the file open request. When a READY signal is sent back from the disk drive 34, the process proceeds from the step S11 to a step S13 so as to set a file pointer FP to a last address of the movie file to be opened. On the other hand, if a NOT READY signal is sent back from the disk drive 34, NO is determined in the step S11, the movie file having the aforementioned file name is newly created in a step S15, and also a movie file header is written into the new movie file in a step S17.

As a result of a file creating process in the step S15, the file name determined in the step S5 and size information indicating "0" are written into the root directory area 38b shown in FIG. 2. Furthermore, as a result of the process in the step S17, the movie file header including the frame rate and information regarding the resolution set in the step S1, i.e. photographing condition information, is written into the data area 38c. At a point of time that the movie file header is written, the file pointer FP is located at the last address of the movie file header.

It is noted that NO is determined in the step S11, which is a first time after the movie file name is determined in the step S5, and at this time, the movie file is newly created in the step S15. Furthermore, YES is determined in the step S11, which is after YES is determined in a step S27 described later, and at this time, the file pointer FP is set to the last address of the movie file in the step S13.

Figure 8:
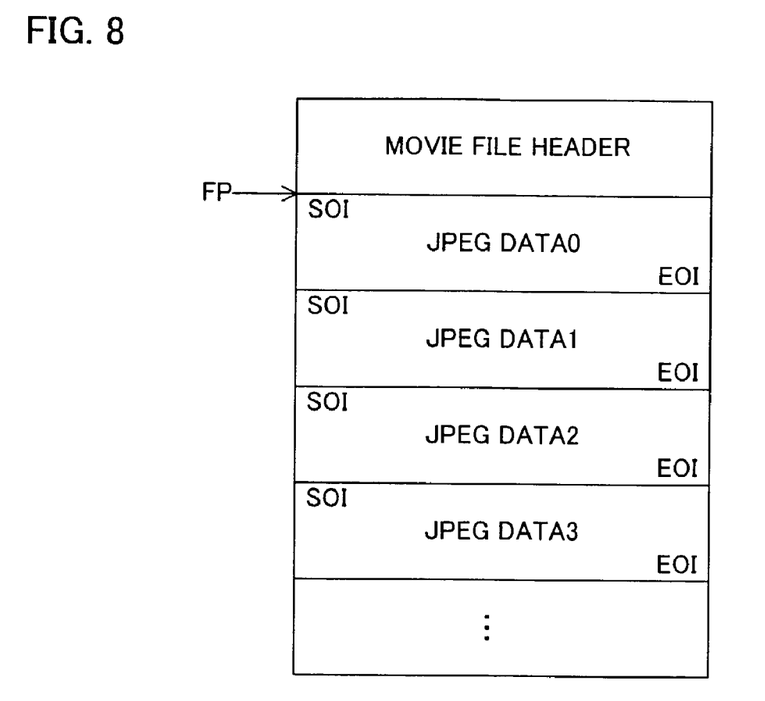
FIG. 8 is an illustrative view showing one example of structure of an uncompleted movie file.

In a step S19, it is determined whether or not the vertical synchronization signal is outputted from the SG 16, and if YES is determined, a process for fetching one frame of image is performed in a step S21. More specifically, a process instruction according to a set resolution is applied to the TG 14 and the signal processing circuit 22, and also a compression instruction is applied to the JPEG CODEC 32. Furthermore, one frame of the JPEG data obtained by such the processes are read out from the JPEG data storing area 26b of the SDRAM 26, and the JPEG data, along with a recording instruction, is applied to the disk drive 34. The JPEG data is recorded subsequent to the file pointer FP of the movie file to be opened. That is, the movie file is generated as shown in FIG. 8.

It is noted that markers SOI (Start Of Images) and EOI (End Of Images) are embedded at a head and a last of each frame of the JPEG data, respectively. Either the marker SOI or EOI is expressed by 16 bits. The SOI is "ffd8", and the EOI is "ffd9".

Upon completion of recording the JPEG data, a file close process is performed in a step S23. More specifically, in addition to updating the size information written in the root directory area 38b, the FAT information of the FAT area 38a is updated in such a manner that a link is formed between clusters in which the JPEG data is recorded.

It is determined whether or not a mode is ended in a step S25, and it is determined whether or not a photographing trigger is issued in a step S27. If the mode is not ended, processes that follow the step S9 are repeated in response to an issuing of the photographing trigger. In the interval photographing, unless the photographing of the set number of frames to be photographed is completed, the process proceeds from the step S25 to the step S27, and in the animation photographing, unless the end key 52 is operated, the process proceeds from the step S25 to the step S27. When the photographing of the number of frames to be photographed set in the interval photographing is completed or the end key 52 is operated in the animation photographing, processes that follow a step S29 are carried out in order to complete the movie file, determining that the mode is ended.

Firstly, the movie file in an uncompleted state is opened in a step S29. That is, the file pass including the file name determined in the step S5 is applied to the disk drive 34 so as to open the uncompleted movie file. In a step S31, header portion data of the uncompleted movie file to be opened (data including the movie file header and one portion of the first frame of the JPEG data) is read out from the data area 38c, and the read header portion data is written into a work area 26c of the SDRAM 26. Since a data size of the movie file header is determined in advance, a head address of the first frame of the JPEG data is detected from the header portion data stored in the work area 26c in a step S33, and the file pointer FP is set to the address on the movie file that corresponds to the detected head address in a step S35. The file pointer FP is set to the head address of JPEG data 0 as shown in FIG. 8.

The frame number i is set to "0" in a step S37, and a predetermined amount of data present subsequent to the file pointer FP is transferred from the data area 38c to the work area 26c in a step S39. The predetermined amount is an amount equivalent to 1.5 frames of the JPEG data (1.5 times a target frame size), and calculated on the basis of the resolution selected in the step S1. The read data is mapped in the work area 26c as shown in FIG. 9.

Figure 9:
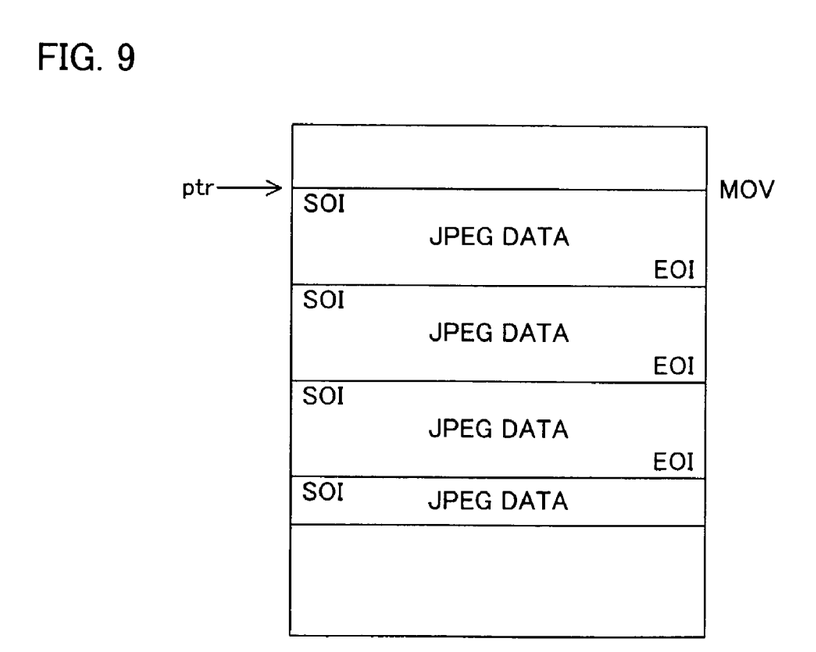
FIG. 9 is an illustrative view showing one example of a mapping state of an SDRAM.
Figure 10:
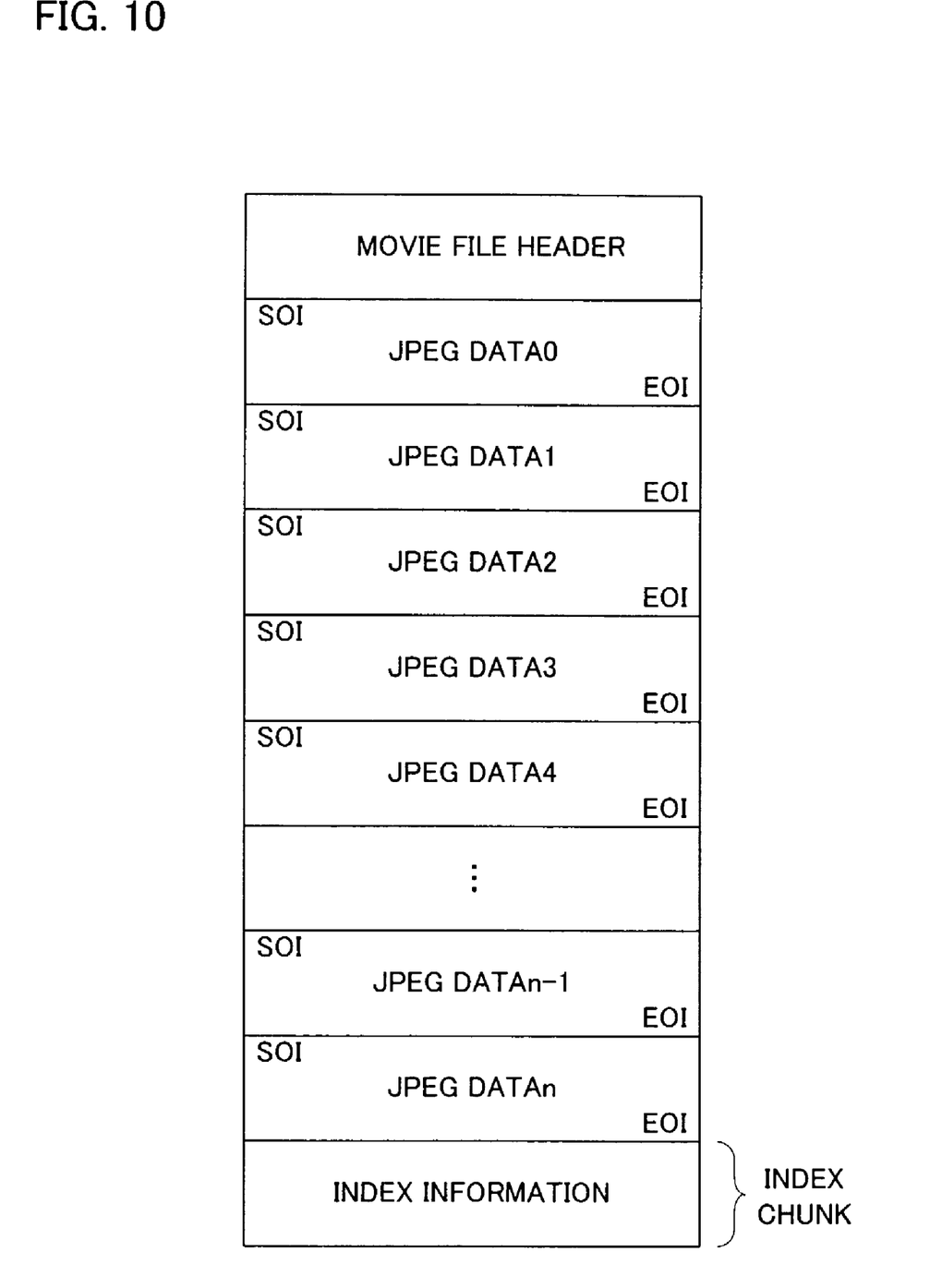
FIG. 10 is an illustrative view showing one example of structure of a completed movie file.

A pointer ptr is set to an address MOV shown in FIG. 9 in a step S41. The address MOV is a head address of the data of the predetermined amount stored in the work area 26c. When the pointer ptr is set, a flag SOI_flg is reset in a step S43, and "*ptr" is compared with "ff" in a step S45. A setting position of the pointer ptr is advanced by one address in a step S47, and "*ptr" is compared with "d8" in a step S49.

"*ptr" means an address value of the setting position of the pointer ptr, and "0x" means hexadecimal. As described above, since a value of the marker SOI is described "ffd8" by using 16 bits, and each address of the SDRAM 26 is 8 bit, "ffd8" is described by using two addresses. Steps S45-S49 are processes for determining whether or not the marker SOI is written into the two addresses to be noticed.

Unless the marker SOI is detected, NO is determined in one of the step S45 and the step S49. In this case, the process moves to a step S77 shown in FIG. 7, assuming that the predetermined amount of the data stored in the work area 26c is inappropriate data not constituting the uncompleted movie file. On the other hand, when the marker SOI is detected, the process proceeds from the step S49 to a step S51 so as to set the flag SOI_flg to "1", and also set a pointer cptr to "ptr−1". The pointer cptr points at the head address of the JPEG data including the detected marker SOI.

The pointer ptr is updated by one address in a step S53, and an address of a setting position of the pointer ptr is determined in a succeeding step S55. Herein, unless the address of the setting position exceeds "MOV+predetermined amount", processes of steps S57-S63 are carried out. "*ptr" is compared with "ff" in a step S57, the setting position of the pointer ptr is updated by one address in a step S59, "*ptr" is compared with "d8" in a step S61, and "*ptr" is compared with "d9" in a step S63. "ffd8" indicates a 16-bit value of the marker SOI, and "ffd9" indicates a 16-bit value of the marker EOI. Accordingly, the steps S57-S63 are processes for determining whether or not the marker SOI or EOI is written in the two addresses to be noticed.

Unless a first address value of the two addresses to be noticed is "ff", the process returns to the step S53 without determining a next address value. If the first address value is "ff", it is determined whether or not the next address value is "d8" in the step S61, and it is determined whether or not the next address value is "d9" in the step S63. When the address value shows "d8", the process proceeds from the step S63 to a step S77, when the address value shows "d9", the process proceeds from the step S63 to a step S65, and when neither of the address values shows "d8" nor "d9", the process returns to the step S53.

That is, when the marker SOI is once again detected following a detection of the marker SOI in the steps S45-S49, the process proceeds to the step S77, assuming that inappropriate data other than the uncompleted movie file is included in the predetermined amount of the data stored in the work area 26c. In addition, when the address of the setting position of the pointer ptr exceeds "MOV+predetermined amount" while the marker EOI is not detected, the process also proceeds to the step S77, assuming that the inappropriate data other than the uncompleted movie file is included in the predetermined amount of the data. On the other hand, when the marker EOI is detected, the process proceeds to the step S65, assuming that one frame of the JPEG data that constitutes the uncompleted move file is stored in the work area 26c.

The pointer ptr is updated by one address in the step S65, and a size of one frame of the JPEG data detected this time is calculated according to Equation 1 in a succeeding step S67.

$$\text{size}[i]=ptr-cptr \qquad \text{(Equation 1)}$$

The pointer ptr points at a next address of the two addresses into which the marker EOI is written, and the pointer cptr points at a first address of the two addresses into which the SOI is written. This makes it possible to calculate the size of the current frame image by subtracting the pointer cptr from the pointer ptr.

Figure 11:
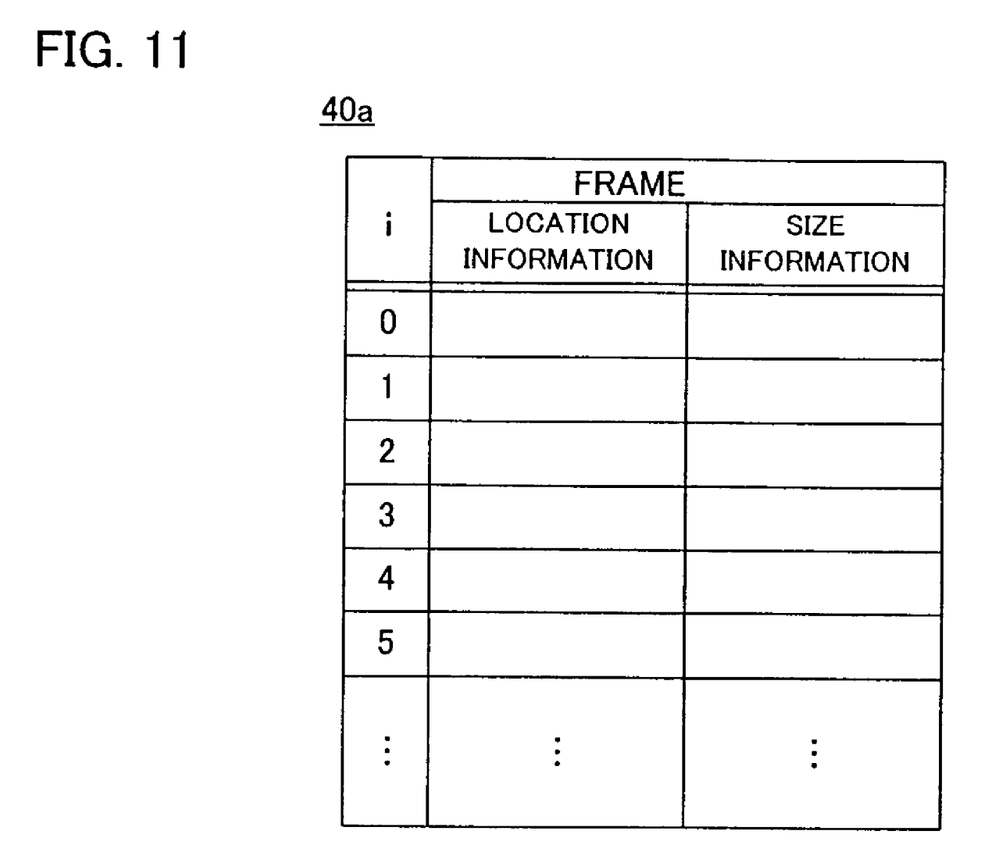
FIG. 11 is an illustrative view showing one example of structure of an index information table.

Index information of the JPEG data detected this time is written onto an index information table 40a shown in FIG. 11 in a step S69. More specifically, starting location information of the detected JPEG data (=cptr) and size information (=size[i]) are written onto the index information table 40a. Upon completion of writing the index information, the frame number i is incremented in a step S71.

The same JPEG data as the JPEG data stored in the work area 26c is specified from the uncompleted movie file in a step S73, and the file pointer FP is set to a next address of a last address of the specified JPEG data. It is determined whether or not an updated file pointer FP exceeds the last address of the uncompleted movie file, and if NO is determined, the processes that follow the step S39 are repeated. However, if YES is determined, the process proceeds to a step S77.

In the step S77, the current frame number i is determined as the total number of frames included in the uncompleted movie. An index chunk including the index information written on the index information table 40a shown in FIG. 11 and the total number of frames determined in the step S77 is generated after the file pointer FP in a succeeding step S79. A total size value of the uncompleted movie file after the index chunk is added is calculated on the basis of the size information written onto the index information table 40a in a step S81. The calculated total size value is added onto the movie file header in a step S83. This completes a movie file that satisfies a Quick Time format. In a step S85, a closing process of the completed movie file is carried out. In the closing process, in addition to writing the size information showing the calculated total size into the root directory area 38*b*, the FAT information of the FAT area 38*a* is updated in such a manner that a link is formed to the index chunk. Upon closing the movie file, the photographing process is ended.

As understood from the above descriptions, the markers SOI and EOI are embedded in the JPEG data of each frame, and as a result, such the JPEG data is recorded into the magnetooptical disk 38. Upon completion of recording a plurality of frames of JPEG data, the JPEG data of each frame is read out onto the work area 26*c* of the SDRAM 26 so as to detect the markers SOI and EOI from the JPEG data. The index information (head address information and size information) is generated on the basis of the detected markers SOI and EOI. Generated index information is recorded following the JPEG data of the last frame, and this completes the movie file that satisfies the Quick Time format.

Thus, the index information generated on the basis of the markers SOI and EOI are to be associated with a plurality of frames of JPEG data, making it possible to continuously reproduce a plurality of frames of JPEG data by referring to the index information. That is, it is possible to reproduce a plurality of frames of JPEG data as a moving image by a simple process, e.g. to generate index information.

It is noted that in this embodiment, the movie file is opened/closed at every time of the photographing (S9, S29). Thus, the desired number of photographing processes (S7-S27) and the movie file completing processes (S29-S85) may be divided so as to execute the movie file completion process in response to an operation of specified keys. This enables to operate to turn on/off the power in an interim period of the photographing process and the movie file completing process, thus improving on restraining consumed electricity.

In addition, in view of a fact that the movie file is opened/closed at every time of the photographing, the power may be completely turned on/off in an interim period of the photographing in the animation photographing, and a supply of power to a circuit other than the CPU 40 may be turned on/off in an interim period of the photographing in the interval photographing. This enables to restrain the consumed electricity.

It is noted that in this embodiment, an FAT system is adopted as a file managing system. However, a UDF (Universal Disk Format) may be adopted in place thereof.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image recording apparatus for recording a plurality of still image signals into a recording medium in a state that markers are added to the respective signals, comprising;
    a detector for detecting the markers recorded in said recording medium;
    a generator for generating recording location information of the plurality of still image signals on the basis of the markers detected by said detector;
    a determiner for determining whether or not a detecting manner of said detector meets an error condition; and
    a recorder for recording into said recording medium the recording location information generated by said generator in association with the plurality of still image signals before a determination result of said determiner becomes affirmative,
    wherein the markers include a start marker set at a head of each still image and an end marker set at a last of each still image, and
    wherein the start marker, said each still image and the end marker are successively recorded on the recording medium.

2. An image recording apparatus according to claim 1, wherein the markers are added to a head and a last of the respective still image signals, and the recording location information includes a head address and a size of the respective still image signals.

3. An image recording apparatus according to claim 1, wherein said detector includes a reader for reading out the still image signals recorded into said recording medium onto an internal memory, and a marker detector for detecting the markers by examining said internal memory.

4. An image signal recording method, comprising steps of:
    (a) recording a plurality of still image signals into a recording medium in a state that markers are added to the respective signals;
    (b) detecting the markers recorded in said recording medium;
    (c) generating recording location information of said plurality of still image signals on the basis of the markers detected in said step (b);
    (d) determining whether or not a detecting manner of said step (b) meets an error condition; and
    (e) recording into said recording medium the recording location information generated in said step (c) in association with the plurality of still image signals before a determination result of said step (d) becomes affirmative,
    wherein the markers include a start marker set at a head of each still image and an end marker set at a last of each still image, and
    wherein the start marker, said each still image and the end marker are successively recorded on the recording medium.

5. An image recording apparatus, comprising:
    a first creator for periodically creating a still image having a marker;
    a first writer for writing to a moving image file period information indicative of a creating period of said first creator;
    a second writer for writing to the moving image file the still images created by said first creator;
    a detector for detecting the markers of the still images accommodated in the moving image file after said second writer has completed a writing process;
    a second creator for creating location information indicative of locations of the still images accommodated in the moving image file in reference to the markers detected by said detector;
    a determiner for determining whether or not a detecting manner of said detector meets an error condition; and
    a third writer for writing to the moving image file the location information created by said second creator before a determination result of said determiner becomes affirmative,
    wherein the markers include a start marker set at a head of each still image and an end marker set at a last of each still image, and
    wherein the start marker, said each still image and the end marker are successively recorded on the moving image file.

6. An image recording apparatus according to claim 5, wherein the markers are added to a head and a last of the respective still images, and the location information includes a head address and a size of the respective still images.

7. An image recording apparatus according to claim 5, wherein said detector includes a reader for reading out the still images accommodated in the moving image file onto an internal memory, and a marker detector for detecting the markers by examining said internal memory.

8. An image recording method, comprising the steps of:
(a) periodically creating a still image having a marker;
(b) writing to a moving image file period information indicative of an executing period of said step (a);
(c) writing to the moving image file the still images created in said step (a);
(d) detecting the markers of the still images accommodated in the moving image file after a writing process in said step (c) has been completed;
(e) creating location information indicative of locations of the still images accommodated in the moving image file in reference to the markers detected in said step (d);
(f) determining whether or not a detecting manner of said step (d) meets an error condition; and
(g) writing to the moving image file the location information created in said step (e) before a determination result of said step (f) becomes affirmative,
wherein the markers include a start marker set at a head of each still image and an end marker set at a last of each still image, and
wherein the start marker, said each still image and the end marker are successively recorded on the moving image file.

9. An image recording apparatus, comprising;
a first creator for creating a plurality of still images to each of which different markers are added;
a first recorder for recording to a recording medium the plurality of still images created by said first creator;
a detector for detecting the markers recorded in said recording medium after completion of a recording process by said first recorder;
a second creator for creating location information of the plurality of still images recorded in said recording medium based on a detection result of said detector;
a determiner for determining whether or not a detecting manner of said detector meets an error condition; and
a second recorder for recording to said recording medium the location information created by said second creator before a determination result of said determiner becomes affirmative.

10. An image recording apparatus according to claim 9, wherein said error condition includes a sequence condition of the same marker being consecutively detected, and an interval condition of a marker detecting interval exceeding a threshold value.

11. An image recording apparatus according to claim 9, wherein said detector includes a reader for reading out the still images recorded in said recording medium onto an internal memory, and a marker detector for detecting the markers by examining said internal memory.

12. An image recording method, comprising the steps of:
(a) creating a plurality of still images to each of which different markers are added;
(b) recording to a recording medium the plurality of still images created by said step (a);
(c) detecting the markers recorded in said recording medium after completion of a recording process by said step (b);
(d) creating location information of the plurality of still images recorded in said recording medium based on a detection result of said step (c);
(e) determining whether or not a detecting manner of said step (c) meets an error condition; and
(f) recording to said recording medium the location information created by said step (d) before a determination result of said step (e) becomes affirmative.

* * * * *